United States Patent
Rezk et al.

(10) Patent No.: US 11,054,524 B2
(45) Date of Patent: Jul. 6, 2021

(54) OPTIMIZING A LIDAR SYSTEM USING SUB-SWEEP SAMPLING

(71) Applicant: AEVA, INC., Mountain View, CA (US)

(72) Inventors: Mina Rezk, Haymarket, VA (US); Neeraj Tayal, Milpitas, CA (US)

(73) Assignee: Aeva, Inc., Mountain View, CA (US)

( * ) Notice: Subject to any disclaimer, the term of this patent is extended or adjusted under 35 U.S.C. 154(b) by 0 days.

(21) Appl. No.: 17/148,397

(22) Filed: Jan. 13, 2021

(65) Prior Publication Data

US 2021/0132226 A1   May 6, 2021

Related U.S. Application Data

(63) Continuation of application No. 16/283,179, filed on Feb. 22, 2019.

(51) Int. Cl.
*G01S 17/34* (2020.01)
*G01S 17/42* (2006.01)
*G01S 7/481* (2006.01)
*G01S 17/58* (2006.01)

(52) U.S. Cl.
CPC .......... *G01S 17/34* (2020.01); *G01S 7/4817* (2013.01); *G01S 17/42* (2013.01); *G01S 17/58* (2013.01)

(58) Field of Classification Search
CPC .......... G01S 17/34; G01S 17/42; G01S 17/58; G01S 7/4817
See application file for complete search history.

(56) References Cited

U.S. PATENT DOCUMENTS

| | | | | |
|---|---|---|---|---|
| 9,784,560 | B2 * | 10/2017 | Thorpe | H04B 10/07953 |
| 10,355,446 | B1 * | 7/2019 | Ensher | H01S 5/0617 |
| 2009/0087186 | A1 * | 4/2009 | Holman | H04B 10/508 |
| | | | | 398/102 |
| 2011/0228249 | A1 * | 9/2011 | Koehler | G01S 17/89 |
| | | | | 356/4.01 |
| 2015/0198433 | A1 * | 7/2015 | Saint Clair | G01C 11/00 |
| | | | | 356/72 |
| 2019/0383907 | A1 * | 12/2019 | Belsley | G01S 7/4815 |
| 2020/0241139 | A1 * | 7/2020 | Roos | G01S 17/89 |

* cited by examiner

*Primary Examiner* — Sang H Nguyen
(74) *Attorney, Agent, or Firm* — Womble Bond Dickinson (US) LLP

(57) ABSTRACT

A light detection and ranging (LiDAR) core is provided that transmits optical beams, and detects return optical beams. The transmitted optical beams are antiphase chirps that sweep a frequency band, and the sweep of the antiphase chirps includes multiple sub-sweeps over respective sub-bands of the frequency band. The system routes the transmitted optical beams that are launched towards a target, and receives light incident upon the target into the return optical beams. The system simultaneously measures and thereby produces multiple simultaneous measurements of first and second beat frequencies per sweep of the antiphase chirps, from the transmitted and returned optical beams, and includes a simultaneous measurement of the first and second beat frequencies per sub-sweep of the multiple sub-sweeps. And the system determines a range and velocity of the target from the multiple simultaneous measurements of the first and second beat frequencies per sweep of the antiphase chirps.

19 Claims, 7 Drawing Sheets

OPTICAL DOMAIN

OPTIMIZING A LIDAR SYSTEM USING SUB-SWEEP SAMPLING

CROSS-REFERENCE TO RELATED APPLICATION

This application is a continuation of U.S. patent application Ser. No. 16/283,179, filed Feb. 22, 2019, the entire contents of which are hereby incorporated by reference.

TECHNOLOGICAL FIELD

The present disclosure relates generally to light detection and ranging (LiDAR) and, in particular, to multiple-wavelength chirped LiDAR that provides simultaneous measurement of range and velocity across two dimensions.

BACKGROUND

Most traditional LiDAR systems are pulse based and use direct time-of-flight (TOF) detection. In other words, they calculate range by precisely measuring the duration between the emission of an optical pulse and the detection of that same optical pulse. Their reliance on TOF detection fundamentally means they cannot measure the range and velocity of an object simultaneously. Moreover, direct detection of the pulses cannot distinguish between those pulses generated by one unit from other pulses generated by a different unit. This undesired crosstalk renders such LiDAR systems blind, and therefore useless at scales desired for applications like autonomous driving.

A different type of LiDAR uses frequency modulation (FM) to overcome the shortcomings of traditional LiDAR systems. FM LiDAR systems keep the power of the optical beam constant while modulating its frequency. In these systems the beam's frequency (inversely related to the wavelength) is periodically swept between a low value and a high value about a central frequency. The sweep time, $T_S$, is also the period of the modulation waveform, and the delay between the transmitted and return waveforms, also called the "echo," is $\Delta t$. The phase difference between these two waveforms yields a beat frequency. This modulation technique is primarily valid when $\Delta t \ll T_S$. But the condition usually does not hold for long-range systems (~200 meters) with a higher $\Delta t$, and fast-measurement systems with a lower $T_S$.

BRIEF SUMMARY

The present disclosure thus includes, without limitation, the following example implementations.

Some example implementations provide a light detection and ranging (LiDAR) core comprising an active optical circuit configured to generate first and second transmitted optical beams that are independently modulated and launched towards a target, and detect first and second return optical beams into which light incident upon the target is collected, at least the first transmitted optical beam being frequency modulated with sweeps of a frequency band to produce chirps, each sweep of the sweeps being divisible into multiple sub-sweeps over respective sub-bands of the frequency band; receivers configured to simultaneously measure and thereby produce multiple simultaneous measurements of first and second beat frequencies per sweep of the sweeps, from the first and second transmitted optical beams and the first and second return optical beams, and including a simultaneous measurement of the first and second beat frequencies per sub-sweep of the multiple sub-sweeps; and a signal processor configured to determine a range and velocity of the target from the multiple simultaneous measurements of the first and second beat frequencies per sweep of the antiphase chirps.

In some example implementations of the LiDAR core of any preceding example implementation, or any combination of preceding example implementations, at least the first transmitted optical beam has a sine, triangle or sawtooth waveform.

In some example implementations of the LiDAR core of any preceding example implementation, or any combination of preceding example implementations, the sweeps of the chirps alternate up-sweeps and down-sweeps in which frequency respectively increases and decreases, and the up-sweeps, the down-sweeps, or the up-sweeps and the down-sweeps have unequal chirp rates.

In some example implementations of the LiDAR core of any preceding example implementation, or any combination of preceding example implementations, each sweep of the sweeps is divisible into multiple sub-sweeps over respective, partially-overlapping sub-bands of the frequency band.

In some example implementations of the LiDAR core of any preceding example implementation, or any combination of preceding example implementations, each sweep of the sweeps is divisible into multiple sub-sweeps over respective, non-overlapping sub-bands of the frequency band.

In some example implementations of the LiDAR core of any preceding example implementation, or any combination of preceding example implementations, the second transmitted optical beam has a constant frequency over each sweep of the sweeps of the frequency band, and wherein the first beat frequency is a sweep beat frequency produced from the first transmitted optical beam and the first return optical beam, and the second beat frequency is a Doppler beat frequency produced from the second transmitted optical beam and the second return optical beam.

In some example implementations of the LiDAR core of any preceding example implementation, or any combination of preceding example implementations, the second transmitted optical beam is frequency modulated with opposite sweeps of the frequency band to produce antiphase chirps, each sweep of the sweeps and the opposite sweeps being divisible into the multiple sub-sweeps, and wherein the sweeps and the opposite sweeps include respectively an up-sweep and a down-sweep in which frequency respectively increases and decreases, and the first and second beat frequencies include respectively up-sweep and down-sweep beat frequencies.

In some example implementations of the LiDAR core of any preceding example implementation, or any combination of preceding example implementations, the sweeps alternate first up-sweeps and second down-sweeps, and the opposite sweeps alternate first down-sweeps and second up-sweeps, and wherein at least one of the first up-sweeps and first down-sweeps, first up-sweeps and second up-sweeps, first down-sweeps and second down-sweeps, or second down-sweeps and second up-sweeps have equal chirp rates.

In some example implementations of the LiDAR core of any preceding example implementation, or any combination of preceding example implementations, the sweeps alternate first up-sweeps and second down-sweeps, and the opposite sweeps alternate first down-sweeps and second up-sweeps, and wherein at least one of the first up-sweeps and first down-sweeps, first up-sweeps and second up-sweeps, first down-sweeps and second down-sweeps, or second down-sweeps and second up-sweeps have unequal chirp rates.

In some example implementations of the LiDAR core of any preceding example implementation, or any combination of preceding example implementations, the signal processor being configured to determine the range and velocity of the target includes being configured to determine multiple sub-sweep values of range and velocity from the multiple simultaneous measurements, and per sweep of the sweeps.

In some example implementations of the LiDAR core of any preceding example implementation, or any combination of preceding example implementations, the signal processor being configured to determine the range and velocity of the target includes being configured to determine first and second averages of respectively the first and second beat frequencies from the multiple simultaneous measurements, and determine a sweep value of range and velocity from the first and second averages, and per sweep of the sweeps.

In some example implementations of the LiDAR core of any preceding example implementation, or any combination of preceding example implementations, the signal processor being configured to determine the range and velocity includes being configured to determine the range and velocity of the target over multiple of the sweeps, and wherein the signal processor is further configured to produce a multi-dimensional representation of the target from the range and velocity of the target over the multiple of the sweeps.

In some example implementations of the LiDAR core of any preceding example implementation, or any combination of preceding example implementations, the signal processor being configured to determine the of range and velocity of the target includes being configured to determine multiple sub-sweep values of range and velocity from the multiple simultaneous measurements, and per sweep over the multiple of the sweeps.

In some example implementations of the LiDAR core of any preceding example implementation, or any combination of preceding example implementations, the signal processor being configured to determine the range and velocity of the target includes being configured to determine first and second averages of respectively the first and second beat frequencies from the multiple simultaneous measurements, and determine a sweep value of range and velocity from the first and second averages, and per sweep over the multiple of the sweeps.

In some example implementations of the LiDAR core of any preceding example implementation, or any combination of preceding example implementations, the signal processor being configured to determine the range and velocity of the target further includes being configured to determine multiple sub-sweep values of range and velocity from the multiple simultaneous measurements, there being at least the sweep value and the multiple sub-sweep values of range and velocity per sweep over the multiple of the sweeps.

In some example implementations of the LiDAR core of any preceding example implementation, or any combination of preceding example implementations, the simultaneous measurement of the first and second beat frequencies per sub-sweep includes multiple samples of the first and second beat frequencies, wherein for at least one of the multiple of the sweeps, the signal processor is further configured to produce a custom simultaneous measurement of the first and second beat frequencies for a custom sub-sweep from adjacent ones of the multiple samples across more than one of the sub-sweeps, and wherein the signal processor being configured to determine the range and velocity of the target further includes being configured to determine a custom sub-sweep value of range and velocity from the custom simultaneous measurement, there being at least the sweep value and the custom sub-sweep value of range and velocity for the at least one of the multiple sweeps.

In some example implementations of the LiDAR core of any preceding example implementation, or any combination of preceding example implementations, the LiDAR core is in a LiDAR system that includes an optical scanning system configured to steer the first and second transmitted optical beams to scan a scene including the target, and collect the light incident upon the target into the first and second return optical beams, wherein the signal processor is configured to identify a region of interest in the scene based on the multi-dimensional representation of the scene, and produce the custom simultaneous measurement of the first and second beat frequencies based on the region of interest.

Some example implementations provide light detection and ranging (LIDAR) system comprising the LiDAR core of any preceding example implementation, or any combination of preceding example implementations, and further comprising an optical scanning system configured to steer the first and second transmitted optical beams to scan a scene according to a scanning pattern with a corresponding scan period, wherein each sweep of the sweeps has a sweep time that matches the scan period.

Some example implementations provide a method of light detection and ranging comprising generating first and second transmitted optical beams that are independently modulated and launched towards a target, and detecting first and second return optical beams into which light incident upon the target is collected, at least the first transmitted optical beam being frequency modulated with sweeps of a frequency band to produce chirps, each sweep of the sweeps being divisible into multiple sub-sweeps over respective sub-bands of the frequency band; simultaneously measuring and thereby producing multiple simultaneous measurements of first and second beat frequencies per sweep of the sweeps, from the first and second transmitted optical beams and the first and second return optical beams, and including a simultaneous measurement of the first and second beat frequencies per sub-sweep of the multiple sub-sweeps; and determining a range and velocity of the target from the multiple simultaneous measurements of the first and second beat frequencies per sweep of the antiphase chirps.

In some example implementations of the method of any preceding example implementation, or any combination of preceding example implementations, determining the range and velocity of the target includes determining multiple sub-sweep values of range and velocity from the multiple simultaneous measurements, and per sweep of the sweeps.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

DETAILED DESCRIPTION

Example implementations of the present disclosure are directed to an improved LiDAR core that uses multiple transmitted optical beams at least one of which is frequency modulated with frequency sweeps and including sub-sweep sampling, which provides improved long range and fast measurements. Unlike a typical LiDAR core, the LiDAR core described in the present disclosure does not require a scanner. By employing example implementations of the present disclosure, one can achieve more accurate measurements for range and velocity using either first and second transmitted optical beams that are simultaneously swept, or a first transmitted optical beam that is swept and a second transmitted optical beam having a constant frequency (i.e., a DC signal). Either of these may be measured multiple times per sweep of the beam's frequency.

The LiDAR core may be implemented in any sensing environment, such as, but not limited to, transportation, manufacturing, metrology, medical, and security systems. For example, in the automotive industry, such a device can assist with spatial awareness for automated driver assist systems, or self-driving vehicles. Additionally, it can help with velocity calibration of a moving vehicle without the need for a separate inertial movement unit (IMU). In other examples, the LiDAR core may provide data that can be used for analysis of defects, diagnostics, image processing, or other applications.

Figure 1A:
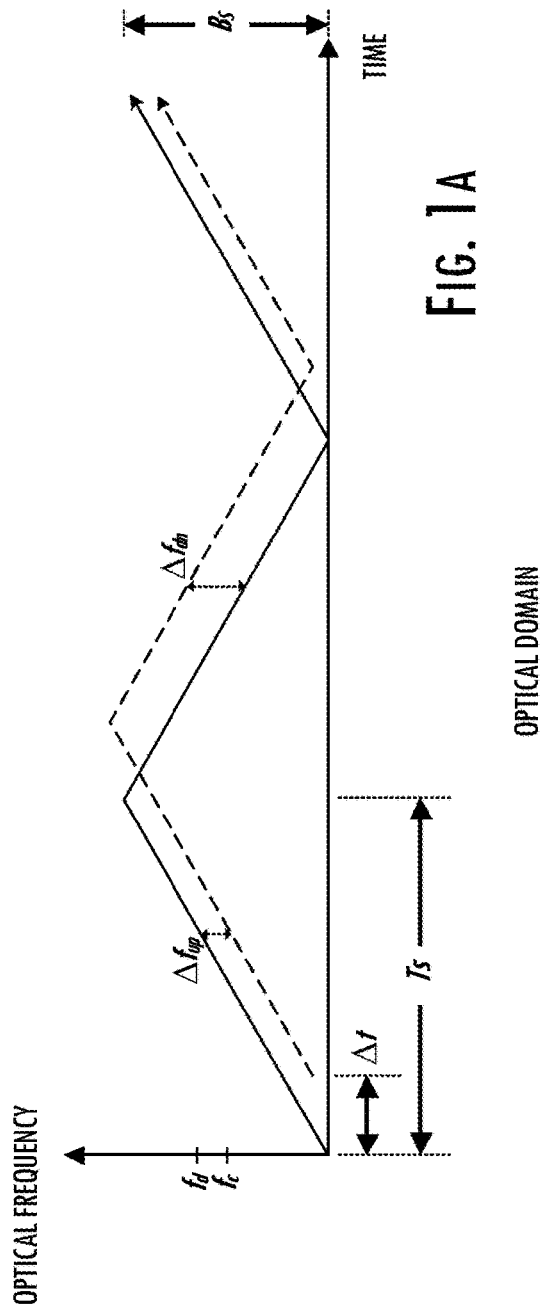
FIGS. 1A and 1B illustrate a triangle modulation scheme for FM LiDAR, and corresponding up-sweep and down-sweep beat frequencies.

As described in the Background section, FM LiDAR systems keep the power of the optical beam constant while modulating its frequency. FIG. 1A shows an example of a triangle modulation waveform wherein the optical beam's frequency (inversely related to the wavelength) is periodically swept between a low value and a high value about a central frequency, $f_c$. Such frequency sweeps are called "chirps." The span between the lower and higher frequencies is the sweep bandwidth, $B_S$, which is sometimes referred to as the "frequency excursion" or more concisely "excursion." The sweep time, $T_S$, is half the period of the triangle modulation waveform. The delay between the transmitted waveform (solid line) and the return waveform (dashed line), also called the "echo," is $\Delta t$. The phase difference between these two waveforms yields a beat frequency, $\Delta f$.

One can calculate the range, R, to a target, or velocity, V, of said target with the following equations:

$$R = \Delta f_{Range} \frac{cT_S}{2B_S} \quad (1)$$

$$V = \Delta f_{Doppler} \frac{\lambda_c}{2} \quad (2)$$

where $\lambda_c = c/f_c$, and the total beat frequency, $\Delta f$ is the sum of the range and Doppler beat frequencies, corresponding to stationary and moving objects, respectively.

The triangle modulation waveform has alternating up-sweeps and down-sweeps. When detecting a moving object, the Doppler effect shifts the center frequency from $f_c$ to $f_d = f_c + \Delta f_{Doppler}$. The Doppler shift enables calculation of the up-sweep and down-sweep beat frequencies using:

$$\Delta f_{up} = \Delta f_{Range} - \Delta f_{Doppler} \quad (3)$$

$$\Delta f_{dn} = \Delta f_{Range} + \Delta f_{Doppler} \quad (4)$$

By solving this system of equations for $\Delta f_{Range}$ and $\Delta f_{Doppler}$ and substituting those values into equations (1) and (2) respectively, one sees that the range and velocity, shown in equations (5) and (6), are proportional to the average and difference, respectively, of the up-sweep and down-sweep beat frequencies.

$$R = \frac{cT_S}{4B_S}(\Delta f_{dn} + \Delta f_{up}) \quad (5)$$

$$V = \frac{\lambda_c}{4}(\Delta f_{dn} - \Delta f_{up}) \quad (6)$$

Figure 1B:
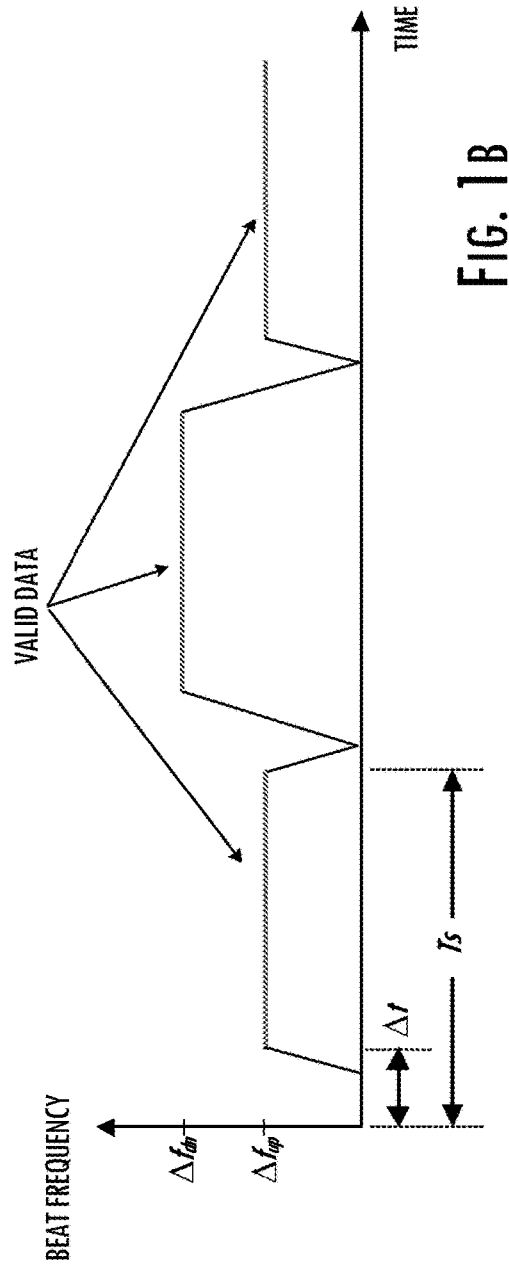

FIG. 1B illustrates the up-sweep and down-sweep beat frequencies, and demonstrates that this technique produces one measurement over the full period of the waveform, $T_S$ (one measurement per chirp), as both beat frequencies are needed to determine range and velocity. As described in the Background section, this modulation technique is primarily valid when $\Delta t \ll T_S$. But the condition usually does not hold for long-range systems (~200 meters) with a higher $\Delta t$, and fast-measurement systems with a lower $T_S$. In some examples in which $\Delta t = 1.3-1.6$ µsec, $T_S$ needs to be greater than 20 µsec, which provides 50,000 points/sec (i.e., 1/20 µsec).

Figure 2A:
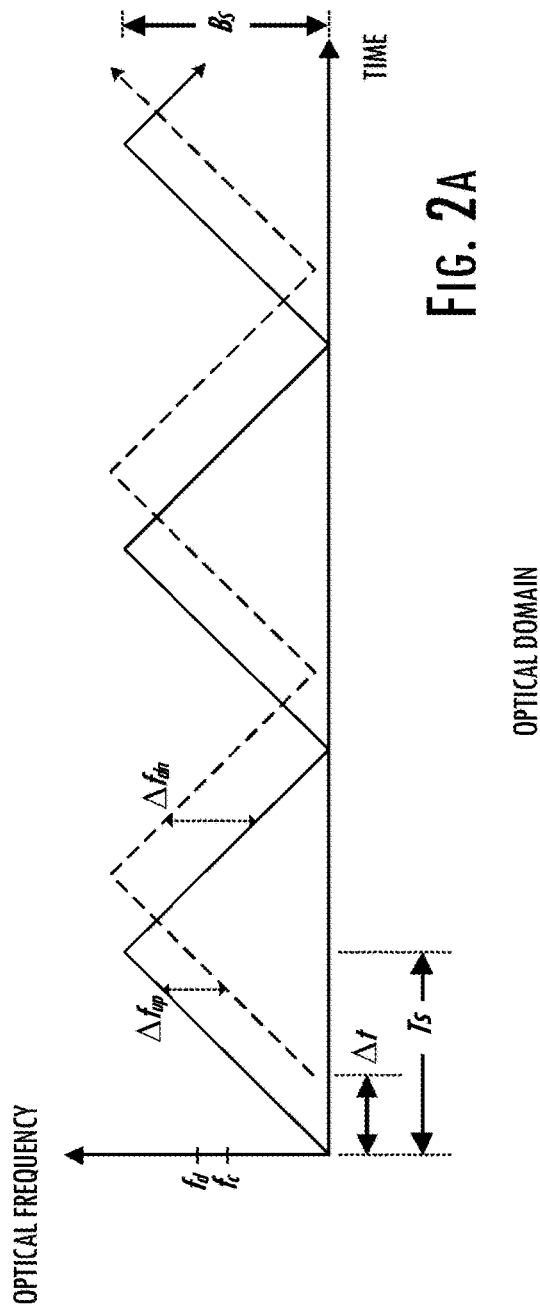
FIGS. 2A and 2B illustrate a triangle modulation scheme for FM LiDAR, and corresponding up-sweep and down-sweep beat frequencies, for a fast-measurement system with a lower sweep time.
Figure 2B:
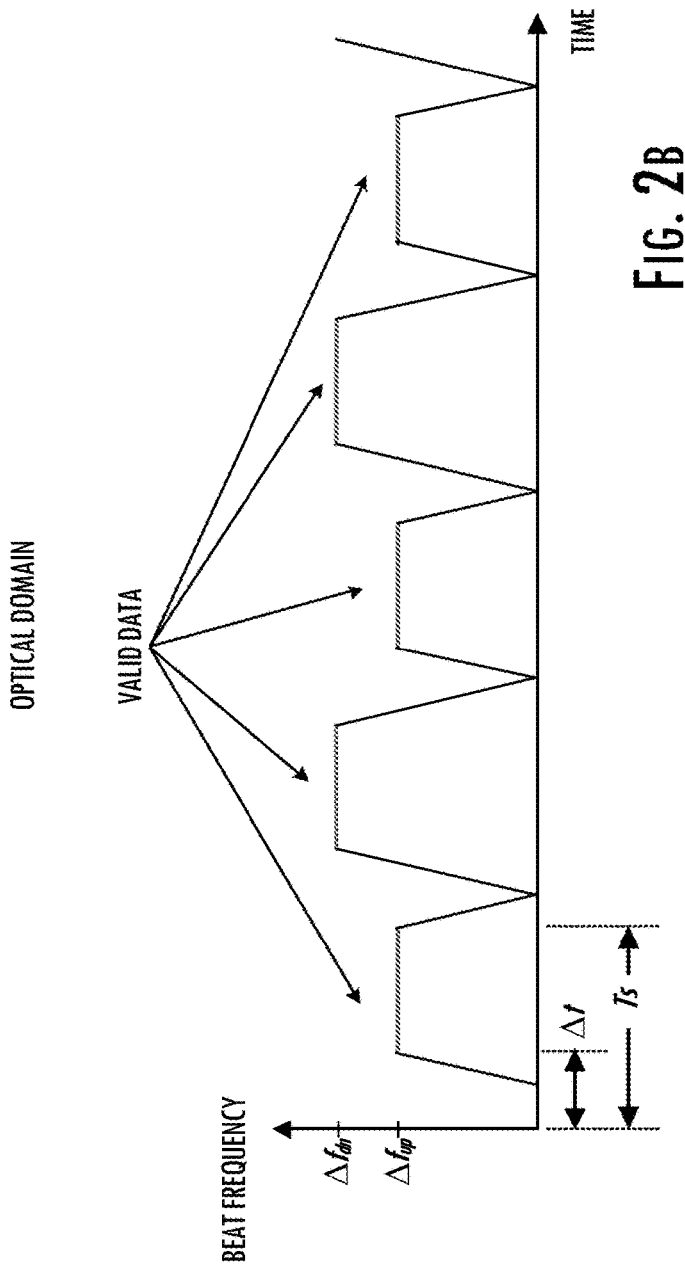

FIGS. 2A and 2B illustrate the transmitted and return waveforms, and the up-sweep and down-sweep beat frequencies, for a lower $T_S$. As $T_S$ decreases, the amount of valid data and thus the signal-to-noise ratio (SNR) also decreases—which in turn reduces the usable range of the system. In some examples, if a system is setup to measure at 200 meters with 200,000 points/second ($T_S$=5 μsec), the system produces only 1 μsec of valid data for a Δt=1.6 μsec. That is, the valid data is round 5 μsec/21.6 μsec=0.9 μsec.

Figure 3A:
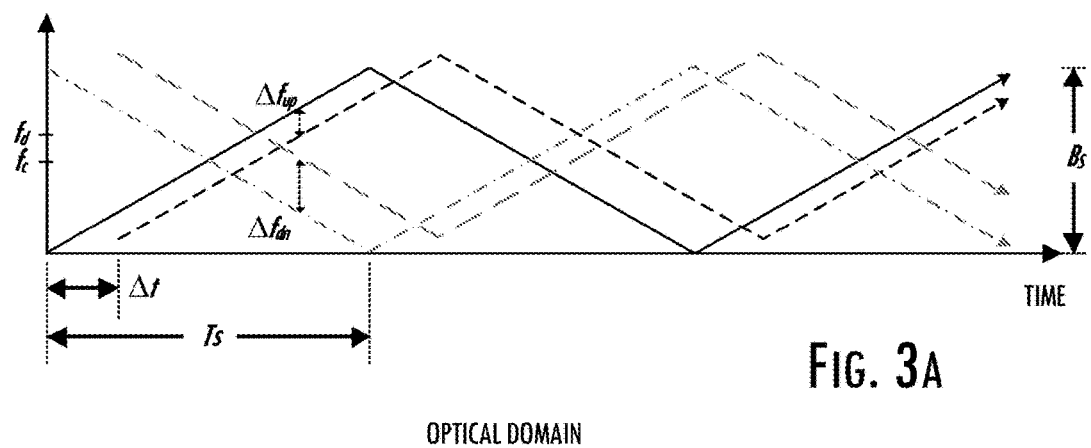
FIGS. 3A and 3B illustrate an antiphase-chirp modulation scheme for FM LiDAR, and corresponding up-sweep and down-sweep beat frequencies, according to example implementations of the present disclosure.
Figure 3B:
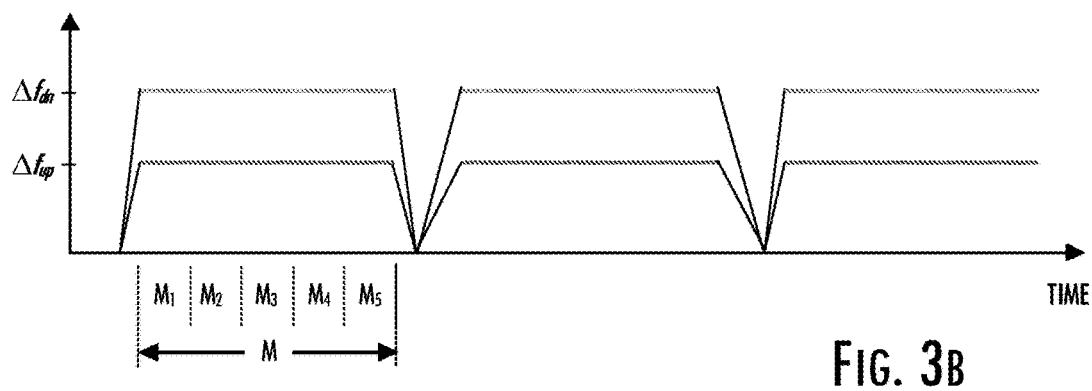

Example implementations of the present disclosure provide improved long range and fast measurements using multiple transmitted optical beams at least one of which is frequency modulated with frequency sweeps and including sub-sweep sampling. FIGS. 3A and 3B illustrate an anti-phase-chirp modulation scheme, and corresponding first and second beat frequencies with sub-sweep sampling, according to example implementations. This modulation involves first and second transmitted optical beams pointed at the same target; and each transmitted optical beam yields its respective echo in first and second return optical beams. This is shown with triangle waveforms in FIG. 3A. Other examples of suitable waveforms include sine waveforms, sawtooth waveforms, and the like.

In antiphase-chirp modulation, the first transmitted optical beam is frequency modulated with sweeps of a frequency band to produce chirps, and the second transmitted optical beam is frequency modulated with opposite sweeps of the frequency band to produce antiphase chirps. The sweeps and the opposite sweeps include respectively an up-sweep and a down-sweep in which frequency respectively increases and decreases, and the first and second beat frequencies include respectively up-sweep and down-sweep beat frequencies. As a result, the system simultaneously measures both beat notes ($\Delta f_{up}$ and $\Delta f_{dn}$) from which it can calculate the range and velocity using equations (5) and (6) for each of a plurality of sub-sweeps, the illustrated example including five sub-sweep measurements $M_1$-$M_5$ of $\Delta f_{up}$ and $\Delta f_{dn}$ per sweep (also illustrating a sweep measurement M). By employing antiphase-chirp modulation, one can achieve more accurate measurements for range and velocity since the up-sweep and down-sweep beat frequencies are simultaneously measured.

Figure 4A:
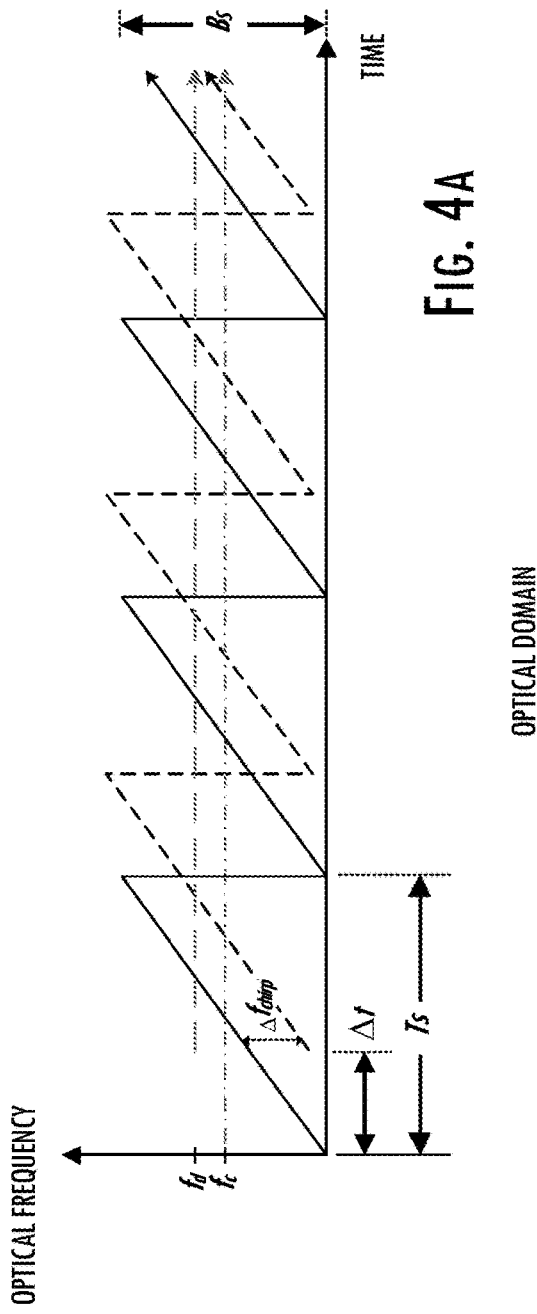
FIGS. 4A and 4B illustrate a chirp and DC modulation scheme for FM LiDAR, and corresponding chirp and Doppler beat frequencies, according to example implementations of the present disclosure.
Figure 4B:
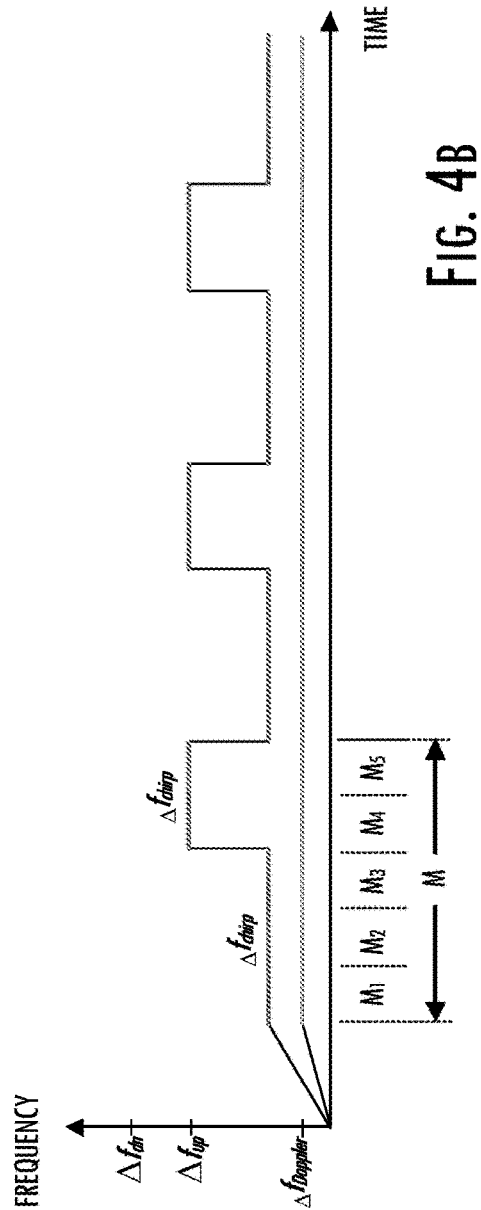

FIGS. 4A and 4B illustrate a chirp and DC modulation scheme, and corresponding first and second beat frequencies with sub-sweep sampling, according to example implementations. Similar to before, chirp and DC modulation involves first and second transmitted optical beams pointed at the same target, with each transmitted optical beam yielding its respective echo in first and second return optical beams. In this modulation scheme, the first transmitted optical beam is again frequency modulated with sweeps of a frequency band to produce chirps (shown in FIG. 4A with a sawtooth waveform), but the second transmitted optical beam has a constant frequency (i.e., a DC signal) over each sweep of the sweeps of the frequency band.

In chirp and DC modulation, the first beat frequency is a sweep beat frequency produced from the first transmitted optical beam and first return optical beam, and the second beat frequency is a Doppler beat frequency produced from the second transmitted optical beam and second return optical beam. As a result, the system simultaneously measures both beat notes ($\Delta f_{chirp}$ and $\Delta f_{Doppler}$) from which it can calculate the range and velocity using equations (1), (2) and (3) for each of a plurality of sub-sweeps, again including multiple sub-sweep measurements of $\Delta f_{chirp}$ and $\Delta f_{Doppler}$ per sweep (also in some examples including a sweep measurement). Similar to anti-phase chirp modulation, by chirp and DC modulation, one can achieve more accurate measurements for range and velocity since the chirp and Doppler beat frequencies are simultaneously measured.

Figure 5:
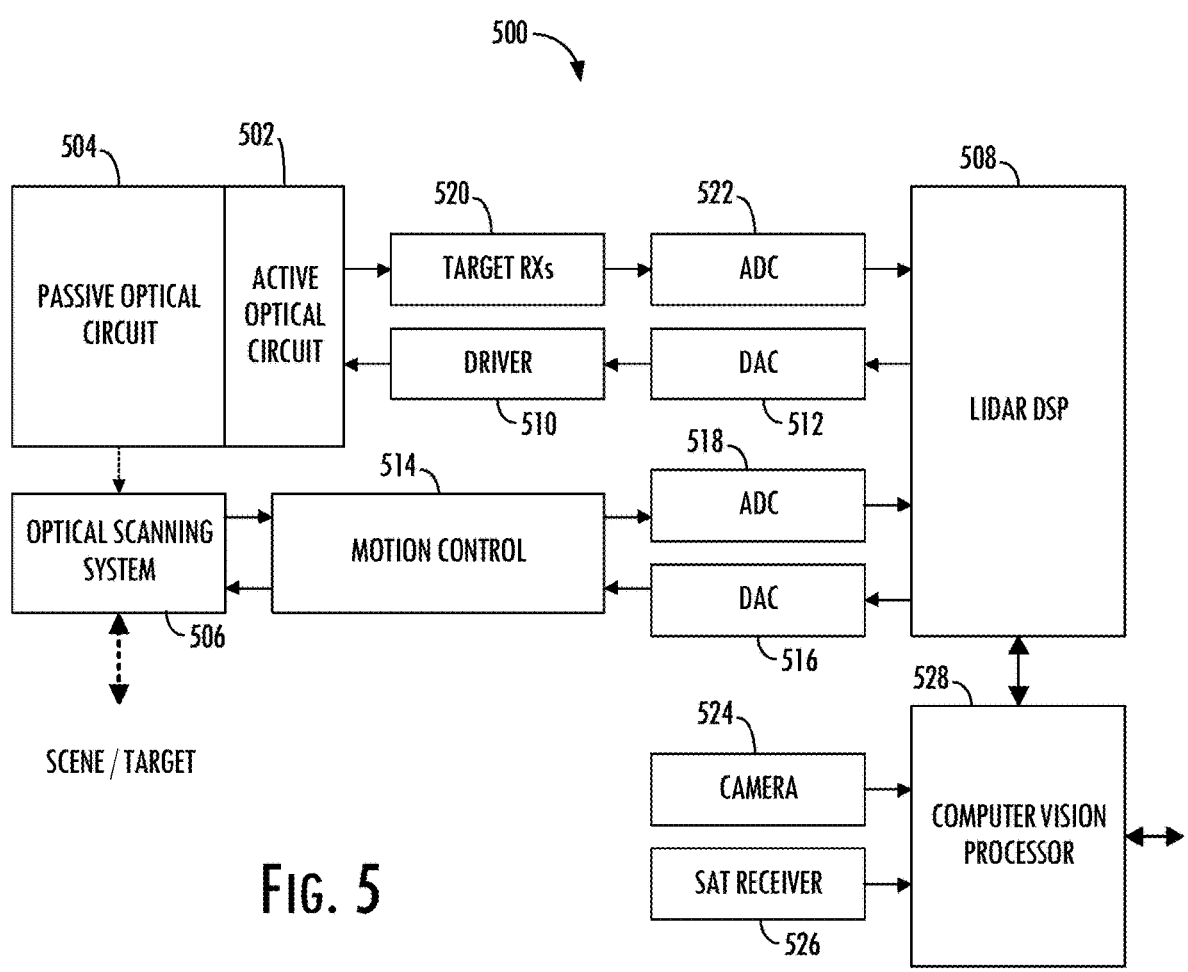
FIG. 5 illustrates a LiDAR system according to example implementations.

FIG. 5 illustrates a LiDAR system 500 according to example implementations of the present disclosure. The LiDAR system includes one or more of each of a number of components. A number of example components are illustrated and described herein. It should be understood that in various implementations, the LiDAR system may omit one or more of the components, or include additional or alternative components than those illustrated and described herein. As shown, the LiDAR system includes an active optical circuit 502 configured to generate, amplify and detect optical signals and the like. In some examples, the active optical circuit includes optical beams at different wavelengths, an optical amplifier, and photodetectors.

The LiDAR system 500 includes a passive optical circuit 504 with one or more waveguides to route and manipulate optical signals to appropriate input/output ports of the active optical circuit 502. The passive optical circuit may include one or more optical components such as taps, wavelength division multiplexers (WDMs), splitters/combiners, polarizing beam splitters (PBSs), Mach-Zehnder interferometers, modulators, optical attenuators, circulators, collimators and the like.

An optical scanning system 506 includes one or more scanning mirrors or other form of beam steering along respective orthogonal axes to steer optical signals to scan a scene according to a scanning pattern. The optical scanning system also collects light incident upon any objects in the scene into a return optical beam that is returned to the passive optical circuit 504. In addition to the mirrors or other form of beam steering, the optical scanning system may include components such as waveplates, lenses, spectral filters, anti-reflective (AR)-coated windows and the like.

To control and support the active optical circuit 502, passive optical circuit 504 and optical scanning system 506, the LiDAR system 500 includes a LiDAR digital signal processor (DSP) 508 configured to function as the central processing unit for the system. The LiDAR DSP is configured to output digital control signals for an optoelectronic driver 510 configured to modulate the optical beams to provide an optical signal. A digital-to-analog converter (DAC) 512 may provide signals to the optoelectronic driver.

The LiDAR DSP 508 is configured to output digital control signals for the optical scanning system 506. A motion control software subsystem 514 may control the optical scanning system. A DAC 516 may convert coordinate routing information from the LiDAR DSP to signals interpretable by the optical scanning system. An analog-to-digital converter (ADC) 518 may in turn convert information about the position of the scanning mirrors (or other form of beam steering) to a signal interpretable by the LiDAR DSP.

The LiDAR DSP 508 is further configured to analyze incoming digital signals. Target receivers 520 measure the optical signal that carries information about the range and velocity of a target in the form of a beat frequency, modulated optical signal. In some examples, the LiDAR DSP is configured to determine or otherwise produce multiple measurements of range and velocity of the target or the scene including the target from multiple signals or a periodic signal, and produce a multi-dimensional (e.g., 3D, 4D) representation of the scene—such as a multi-dimensional point cloud—from the measurements. An ADC 522 converts signals from the target receivers to signals interpretable by the LiDAR DSP.

In some applications, the LiDAR system 500 may additionally include a camera 524 configured to capture images of the scene, and a satellite-based navigation receiver 526 configured to provide a geographic location of the system. A computer vision processor 528 is configured to receive the images and geographic location, and send the images and location or information related thereto to the LiDAR DSP 508.

In operation according to some examples, the LiDAR system 500 is configured to use nondegenerate optical sources to simultaneously measure range and velocity across two dimensions. This capability allows for real-time, long range 4D measurements (range, velocity, azimuth, and elevation) of the surrounding environment (a scene). The system points multiple modulated optical beams to the same target. Suitable examples of optical sources include laser sources, light-emitting diodes (LEDs) and the like. In some examples, more than two optical beams are used. The two or more optical beams may be from the same or separate and distinct optical sources.

In some examples, the scanning process begins with the optoelectronic driver 510 and LiDAR DSP 508. The LiDAR DSP instructs the optoelectronic driver to independently modulate the optical beams, and these modulated signals propagate through the passive optical circuit 504 to the collimator. The collimator directs the light to the optical scanning system 506 that scans the environment over a preprogrammed pattern defined by the motion control software subsystem 514.

The collected optical signals pass through the optical circuits 504, 502 to the target receivers 520. In some examples, the LiDAR system 500 includes two target receivers per beam. The target receivers measure the optical signals encoded with range and velocity information about the environment. Each beam signal that returns from the target produces a time-shifted waveform. The temporal phase difference between the two waveforms generates a beat frequency measured on the photodetectors in the active optical circuit 502.

The analog signals from the target receivers 520 are converted to digital signals using ADC 522. The digital signals are then sent to the LiDAR DSP 508. The LiDAR DSP 508 also receives position data from the motion control software subsystem 214 and optical scanning system 506 as well as image data from the computer vision processor 528.

The computer vision processor 528 collects two-dimensional (2D) images from the camera 524 and sends the data to the LiDAR DSP 508. The system software then overlays the multi-dimensional representation (e.g., 4D point cloud) with the image data to determine velocity and distance of objects in the surrounding area. The system also processes the satellite-based navigation location data to provide a precise global location.

More particularly according to example implementations of the present disclosure, the LiDAR system 500 includes a LiDAR core with at least the active optical circuit 502, target receivers 520 (or more simply receivers) and DSP 508 (or more simply signal processor). The active optical circuit is configured to generate first and second transmitted optical beams that are independently modulated and launched towards a target. The active optical circuit is likewise configured to detect first and second return optical beams into which light incident upon the target is collected. At least the first transmitted optical beam is frequency modulated with sweeps of a frequency band $B_S$ to produce chirps. In some examples, the second transmitted optical beam is frequency modulated with opposite sweeps of the frequency band to produce antiphase chirps (e.g., FIG. 3A). In other examples, second transmitted optical beam has a constant frequency over each sweep of the sweeps of the frequency band (e.g., FIG. 4A).

Figure 6:
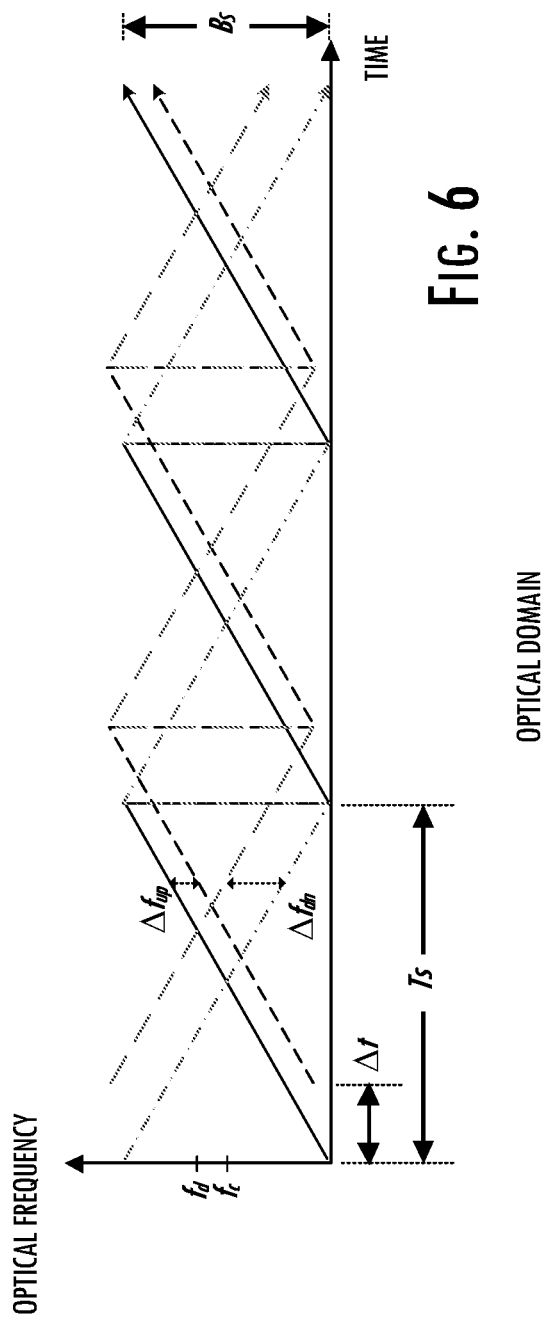
FIGS. 6 and 7 illustrate waveforms according to example implementations.

The first and second transmitted optical beams may have any of a number of different waveforms. In some examples, either or both of the first and second transmitted optical beams have a triangle waveform in which the sweeps and opposite sweeps alternate up-sweeps and down-sweeps in which frequency respectively increases and decreases, as shown in FIG. 3A. In other examples, either or both of the transmitted optical beams have a sawtooth waveform. FIG. 4A illustrates a sawtooth waveform for the first transmitted optical beam in the case of chirp and DC modulation. FIG. 6 illustrates sawtooth waveforms for the first and second transmitted optical beams in the case of antiphase-chirp modulation.

The chirps of the first transmitted optical beam and/or antiphase chirps of the second transmitted optical beam may also have the same (equal) or different (unequal) sweep rates (chirp rates) or duty cycles. The chirp rates may be unequal both within the chirps or antiphase chirps, or across the chirps and antiphase chirps. Having different chirp rates may help with dynamic range resolution, longer range, and may be used to increase range resolution at short range. This may result in the up-sweep and down-sweep having different sweep times, such as an upsweep with a 10 μsec sweep time, and a down-sweep with a 50 μsec sweep time (the waveform thereby having a 60 μsec wave period).

Figure 7:
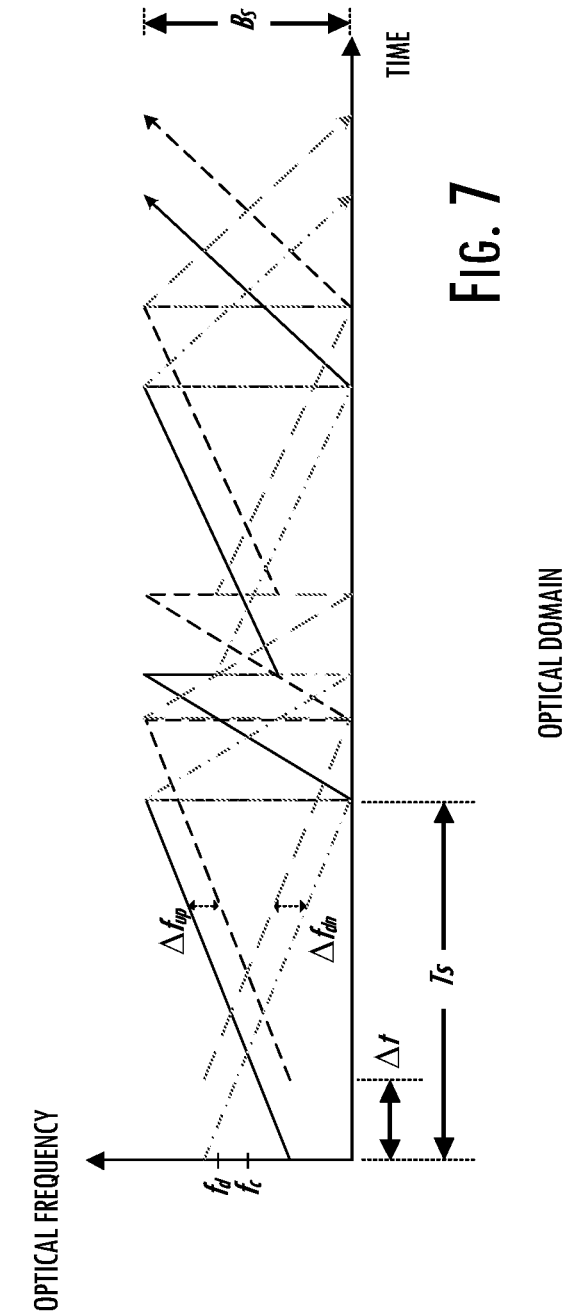

In particular, for example, the up-sweeps or the down-sweeps of the chirps of the first transmitted optical beam and/or antiphase chirps of the second transmitted optical beam may have equal or unequal chirp rates (yielding asymmetric chirps). Each of the respective chirps may have an upsweep and down-sweep with equal or unequal chirp rates. In some examples, the up-sweeps, the down-sweeps, or the up-sweeps and the down-sweeps have equal or unequal chirp rates. In some more particular examples involving antiphase-chirp modulation, the sweeps alternate first up-sweeps and second down-sweeps, and the opposite sweeps alternate first down-sweeps and second up-sweeps. In these examples, at least one of the first up-sweeps and first down-sweeps, first up-sweeps and second up-sweeps, first down-sweeps and second down-sweeps, or second down-sweeps and second up-sweeps have equal or unequal chirp rates. FIG. 7 illustrates sawtooth waveforms for the first and second transmitted optical beams in the case of antiphase-chirp modulation, in which the up-sweeps have unequal chirp rates within the transmitted optical beams, but equal chirp rates across the transmitted optical beams.

Regardless of the shape of the waveforms and their chirp rates, each sweep of the sweeps of the chirps and/or anti-phase chirps is divisible into multiple sub-sweeps over respective sub-bands of the frequency band. In some examples, the sub-sweeps are non-overlapping. In other examples, the sub-sweeps partially overlap, which may help in angular resolution as well as accurately detecting edges of the target.

The target receivers 520 are configured to simultaneously measure and thereby produce multiple simultaneous measurements of first and second beat frequencies per sweep, from the first and second transmitted optical beams and the first and second return optical beams. And these simultaneous measurements include a simultaneous measurement of the first and second beat frequencies per sub-sweep of the multiple sub-sweeps. In the examples shown in FIGS. 3B and 4B, this includes five simultaneous, sub-sweep measurements $M_1$-$M_5$ of $\Delta f_{up}$ and $\Delta f_{dn}$, or $\Delta f_{chirp}$ and $\Delta f_{Doppler}$, per sweep.

The LiDAR DSP 508 is configured to determine a range and velocity of the target from the multiple simultaneous measurements of the first and second beat frequencies per sweep, such as using equations (5) and (6), or equations (1), (2) and (3). In some examples, the LiDAR DSP is configured to determine multiple sub-sweep values of range and velocity from the multiple simultaneous measurements, and per sweep. That is, in the example shown in FIGS. 3B and 4B, the LiDAR DSP may be configured to determine a sub-sweep value of R and V for each of the five simultaneous, sub-sweep measurements $M_1$-$M_5$ per sweep.

Additionally or alternatively, in some examples, the LiDAR DSP 508 is configured to determine first and second averages of respectively the first and second beat frequencies from the multiple simultaneous measurements, and determine a sweep value of range and velocity from the first and second averages, and per sweep. In the example shown in FIG. 3B, the LiDAR DSP may be configured to determine averages of $M_1$-$M_5$ ($\Delta f_{up}$ and $\Delta f_{dn}$) over the five sub-sweeps to produce a sweep measurement M of $\Delta f_{up}$ and $\Delta f_{dn}$. In the example shown in FIG. 4B, the LiDAR DSP may be configured to determine averages of $M_1$-$M_5$ ($\Delta f_{chirp}$ and $\Delta f_{Doppler}$) over the five sub-sweeps to produce a sweep measurement M of $\Delta f_{chirp}$ and $\Delta f_{Doppler}$. The LiDAR DSP can then determine a sweep value of R and V for the sweep measurement M.

In some examples, the LiDAR DSP 508 is configured to determine the range and velocity of the target over multiple of the sweeps. In these examples, the LiDAR DSP is further configured to produce a multi-dimensional representation (e.g., point cloud) of the target from the range and velocity of the target over the multiple of the sweeps. This may include the LiDAR DSP determining multiple sub-sweep values of and/or a sweep value of range and velocity from the multiple simultaneous measurements, and per sweep over the multiple of the sweeps. There may therefore be either multiple sub-sweep values or a sweep value of range and velocity, or both, per sweep over the multiple of the sweeps.

The simultaneous measurement of the first and second beat frequencies $M_1$-$M_5$ per sub-sweep includes multiple samples of the first and second beat frequencies. In some examples, for at least one of the multiple sweeps, the LiDAR DSP 508 may be further configured to produce a custom simultaneous measurement of the first and second beat frequencies for a custom sub-sweep from adjacent ones of the multiple samples across more than one of the sub-sweeps. The LiDAR DSP may then determine a custom sub-sweep value of range and velocity from the custom simultaneous measurement. In these examples, there may be the custom sub-sweep value in addition to or in lieu of one or more of the sub-sweep values or sweep value of range and velocity for at least one of the multiple sweeps.

The custom measurement may be used in a number of different situations. In some situations, the custom measurement provides additional resolution for a region of interest in a scene including the target. In the LiDAR system 500, the optical scanning system 506 may be configured to steer the first and second transmitted optical beams to scan a scene including the target, and collect the light incident upon the target into the first and second return optical beams. The LiDAR DSP 508 may be configured to identify a region of interest in the scene based on the multi-dimensional representation of the scene. The LiDAR DSP may then produce the custom simultaneous measurement of the first and second beat frequencies based on the region of interest through dynamically setting the sweep length.

In some examples, the optical scanning system 506 is configured to steer the first and second transmitted optical beams to scan a scene according to a scanning pattern with a corresponding scan period, and each sweep of the sweeps and/or antiphase sweeps has a sweep time that matches the scan period.

Figure 8:
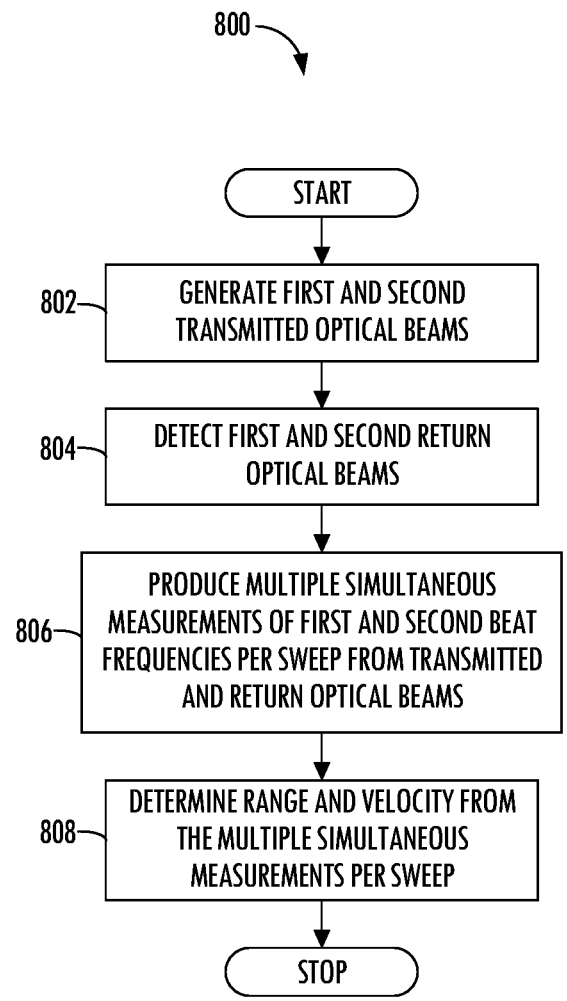
FIG. 8 is a flowchart illustrating various operations in a method of light detection and ranging, according to some examples.

FIG. 8 is a flowchart illustrating various operations in a method 800 of light detection and ranging, according to some example implementations. As shown at blocks 802 and 804, the method includes generating first and second transmitted optical beams that are independently modulated and launched towards a target, and detecting first and second return optical beams into which light incident upon the target is collected. At least the first transmitted optical beam is frequency modulated with sweeps of a frequency band to produce chirps, and each sweep of the sweeps is divisible into multiple sub-sweeps over respective sub-bands of the frequency band.

The method includes simultaneously measuring and thereby producing multiple simultaneous measurements of first and second beat frequencies per sweep of the sweeps, as shown at block 806. These measurements are produced from the first and second transmitted optical beams and the first and second return optical beams, and include a simultaneous measurement of the first and second beat frequencies per sub-sweep of the multiple sub-sweeps. And the method includes determining a range and velocity of the target from the multiple simultaneous measurements of the first and second beat frequencies per sweep of the sweeps, as shown at block 808.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive or.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A light detection and ranging (LIDAR) core comprising:
   an active optical circuit configured to generate first and second transmitted optical beams that are independently modulated and launched towards a target, and detect first and second return optical beams into which light incident upon the target is collected, at least the first transmitted optical beam being frequency modulated with sweeps of a frequency band to produce chirps, each sweep of the sweeps being divisible into multiple sub-sweeps over respective sub-bands of the frequency band, wherein the second transmitted optical beam is frequency modulated with opposite sweeps of the frequency band to produce antiphase chirps, each sweep of the sweeps and the opposite sweeps being divisible into the multiple sub-sweeps, and wherein the sweeps and the opposite sweeps include respectively an up-sweep and a down-sweep in which frequency respectively increases and decreases, and the first and second beat frequencies include respectively up-sweep and down-sweep beat frequencies;
   receivers configured to produce multiple simultaneous measurements of first and second beat frequencies per sweep of the sweeps, from the first and second transmitted optical beams and the first and second return optical beams, and including a simultaneous measurement of the first and second beat frequencies per sub-sweep of the multiple sub-sweeps; and
   a signal processor configured to determine a range and velocity of the target from the multiple simultaneous measurements of the first and second beat frequencies per sweep of the chirps.

2. The LiDAR core of claim 1, wherein at least the first transmitted optical beam has a sine, triangle or sawtooth waveform.

3. The LiDAR core of claim 1, wherein the sweeps of the chirps alternate up-sweeps and down-sweeps in which frequency respectively increases and decreases, and the up-sweeps, the down-sweeps, or the up-sweeps and the down-sweeps have unequal chirp rates.

4. The LiDAR core of claim 1, wherein each sweep of the sweeps is divisible into multiple sub-sweeps over respective, partially-overlapping sub-bands of the frequency band.

5. The LiDAR core of claim 1, wherein each sweep of the sweeps is divisible into multiple sub-sweeps over respective, non-overlapping sub-bands of the frequency band.

6. The LiDAR core of claim 1, wherein the second transmitted optical beam has a constant frequency over each sweep of the sweeps of the frequency band, and
   wherein the first beat frequency is a sweep beat frequency produced from the first transmitted optical beam and the first return optical beam, and the second beat frequency is a Doppler beat frequency produced from the second transmitted optical beam and the second return optical beam.

7. The LiDAR core of claim 1, wherein the sweeps alternate first up-sweeps and second down-sweeps, and the opposite sweeps alternate first down-sweeps and second up-sweeps, and
   wherein at least one of the first up-sweeps and first down-sweeps, first up-sweeps and second up-sweeps, first down-sweeps and second down-sweeps, or second down-sweeps and second up-sweeps have equal chirp rates.

8. The LiDAR core of claim 1, wherein the sweeps alternate first up-sweeps and second down-sweeps, and the opposite sweeps alternate first down-sweeps and second up-sweeps, and
   wherein at least one of the first up-sweeps and first down-sweeps, first up-sweeps and second up-sweeps, first down-sweeps and second down-sweeps, or second down-sweeps and second up-sweeps have unequal chirp rates.

9. The LiDAR core of claim 1, wherein the signal processor being configured to determine the range and velocity of the target includes being configured to determine multiple sub-sweep values of range and velocity from the multiple simultaneous measurements, and per sweep of the sweeps.

10. The LiDAR core of claim 1, wherein the signal processor being configured to determine the range and velocity of the target includes being configured to determine first and second averages of respectively the first and second beat frequencies from the multiple simultaneous measurements, and determine a sweep value of range and velocity from the first and second averages, and per sweep of the sweeps.

11. The LiDAR core of claim 1, wherein the signal processor being configured to determine the range and velocity includes being configured to determine the range and velocity of the target over multiple of the sweeps, and
    wherein the signal processor is further configured to produce a multi-dimensional representation of the target from the range and velocity of the target over the multiple of the sweeps.

12. The LiDAR core of claim 11, wherein the signal processor being configured to determine the of range and velocity of the target includes being configured to determine multiple sub-sweep values of range and velocity from the multiple simultaneous measurements, and per sweep over the multiple of the sweeps.

13. The LiDAR core of claim 11, wherein the signal processor being configured to determine the range and velocity of the target includes being configured to determine first and second averages of respectively the first and second beat frequencies from the multiple simultaneous measurements, and determine a sweep value of range and velocity from the first and second averages, and per sweep over the multiple of the sweeps.

14. The LiDAR core of claim 13, wherein the signal processor being configured to determine the range and velocity of the target further includes being configured to determine multiple sub-sweep values of range and velocity from the multiple simultaneous measurements, there being at least the sweep value and the multiple sub-sweep values of range and velocity per sweep over the multiple of the sweeps.

15. The LiDAR core of claim 13, wherein the simultaneous measurement of the first and second beat frequencies per sub-sweep includes multiple samples of the first and second beat frequencies,
   wherein for at least one of the multiple of the sweeps, the signal processor is further configured to produce a custom simultaneous measurement of the first and second beat frequencies for a custom sub-sweep from adjacent ones of the multiple samples across more than one of the sub-sweeps, and
   wherein the signal processor being configured to determine the range and velocity of the target further includes being configured to determine a custom sub-sweep value of range and velocity from the custom simultaneous measurement, there being at least the sweep value and the custom sub-sweep value of range and velocity for the at least one of the multiple sweeps.

16. The LiDAR core of claim 15 in a LiDAR system that includes an optical scanning system configured to steer the first and second transmitted optical beams to scan a scene including the target, and collect the light incident upon the target into the first and second return optical beams,
   wherein the signal processor is configured to identify a region of interest in the scene based on the multi-dimensional representation of the scene, and produce the custom simultaneous measurement of the first and second beat frequencies based on the region of interest.

17. A light detection and ranging (LIDAR) system comprising the LiDAR core of claim 1, and further comprising:
   an optical scanning system configured to steer the first and second transmitted optical beams to scan a scene according to a scanning pattern with a corresponding scan period,
   wherein each sweep of the sweeps has a sweep time that matches the scan period.

18. A method of light detection and ranging comprising:
   generating first and second transmitted optical beams that are independently modulated and launched towards a target, and detecting first and second return optical beams into which light incident upon the target is collected, at least the first transmitted optical beam being frequency modulated with sweeps of a frequency band to produce chirps, each sweep of the sweeps being divisible into multiple sub-sweeps over respective sub-bands of the frequency band, wherein the second transmitted optical beam is frequency modulated with opposite sweeps of the frequency band to produce antiphase chirps, each sweep of the sweeps and the opposite sweeps being divisible into the multiple sub-sweeps, and wherein the sweeps and the opposite sweeps include respectively an up-sweep and a down-sweep in which frequency respectively increases and decreases, and the first and second beat frequencies include respectively up-sweep and down-sweep beat frequencies;
   simultaneously measuring and thereby producing multiple simultaneous measurements of first and second beat frequencies per sweep of the sweeps, from the first and second transmitted optical beams and the first and second return optical beams, and including a simultaneous measurement of the first and second beat frequencies per sub-sweep of the multiple sub-sweeps; and
   determining a range and velocity of the target from the multiple simultaneous measurements of the first and second beat frequencies per sweep of the sweeps.

19. The method of claim 18, wherein determining the range and velocity of the target includes determining multiple sub-sweep values of range and velocity from the multiple simultaneous measurements, and per sweep of the sweeps.

* * * * *